United States Patent [19]
Foulkes et al.

[11] Patent Number: 5,540,203
[45] Date of Patent: Jul. 30, 1996

[54] INTEGRATED HYDRAULIC SYSTEM FOR AUTOMOTIVE VEHICLE

[75] Inventors: David M. Foulkes, Bloomfield Hills; Gordon Wright, Plymouth, both of Mich.

[73] Assignee: Ford Motor Company, Dearborn, Mich.

[21] Appl. No.: 318,313

[22] Filed: Oct. 5, 1994

[51] Int. Cl.$^6$ .................................... F02D 7/00
[52] U.S. Cl. ........................... 123/446; 180/53.4
[58] Field of Search ................... 123/446, 447, 123/385, 386, 387, 198 C, 90.12, 90.13; 180/53.4, 53.8, DIG. 4, DIG. 5; 60/484; 91/516; 417/222.2, 282, 300, 364

[56] References Cited

U.S. PATENT DOCUMENTS

| | | | |
|---|---|---|---|
| 2,881,706 | 4/1959 | Haynes et al. | 180/DIG. 5 |
| 2,968,914 | 1/1961 | Birmann . | |
| 4,188,925 | 2/1980 | Jordan . | |
| 4,200,067 | 4/1980 | Trenne | 123/90.13 |
| 4,201,272 | 5/1980 | Midolo | 60/484 |
| 4,213,511 | 7/1980 | Rubenstein et al. | 180/DIG. 5 |
| 4,262,580 | 4/1981 | Goff et al. | 180/DIG. 5 |
| 4,285,200 | 8/1981 | Byrne et al. . | |
| 4,322,949 | 5/1982 | Byrne et al. . | |
| 4,420,934 | 12/1983 | Udono | 180/DIG. 5 |
| 4,556,078 | 12/1993 | Wittren | 123/DIG. 5 |
| 4,559,777 | 12/1985 | Leiber | 180/DIG. 5 |
| 4,708,095 | 11/1987 | Luterek . | |
| 4,745,747 | 5/1988 | Krauss et al. | 180/DIG. 5 |
| 4,780,059 | 10/1988 | Taguchi | 417/282 |
| 4,926,800 | 5/1990 | Valev . | |
| 4,966,066 | 10/1990 | Kauss et al. | 180/DIG. 5 |
| 4,971,525 | 11/1990 | Nakayoshi et al. . | |
| 5,051,067 | 9/1991 | Terauchi | 417/222.2 |
| 5,138,985 | 8/1992 | Szodfridt et al. . | |
| 5,168,703 | 12/1992 | Tobias | 60/484 |
| 5,176,115 | 1/1993 | Campion . | |
| 5,232,242 | 8/1993 | Backrach et al. . | |
| 5,245,970 | 9/1993 | Iwaszkiewicz et al. | 123/446 |
| 5,247,914 | 9/1993 | Imai et al. | 123/198 C |
| 5,255,641 | 10/1993 | Schechter . | |
| 5,263,443 | 11/1993 | Schechter et al. . | |
| 5,332,053 | 7/1994 | Vachon | 180/53.4 |
| 5,357,912 | 10/1994 | Barnes et al. | 123/446 |

OTHER PUBLICATIONS

SAE Paper, Jul. 1983, 0098–2571/9107–0049—"Lube Oil Jet Improves Turbo Performance".

*Primary Examiner*—Thomas N. Moulis
*Attorney, Agent, or Firm*—Jerome R. Drouillard; Roger L. May

[57] ABSTRACT

An integrated hydraulic system for an automotive vehicle includes a hydraulic pump (16) coupled with and driven by an internal combustion engine (12) and internal and external hydraulic circuits for operating hydraulically powered engine accessories and hydraulically powered chassis components. An electronic controller (18)) sensing a variety of operating parameters controls the output of the hydraulic pump (16) so as to assure that adequate hydraulic fluid is provided to the various components and accessories.

10 Claims, 2 Drawing Sheets

INTEGRATED HYDRAULIC SYSTEM FOR AUTOMOTIVE VEHICLE

BACKGROUND OF THE INVENTION

The present invention relates to a system for providing hydraulic power to not only the engine but also the chassis of an automotive vehicle, by means of an engine driven hydraulic pump and one or more hydraulic circuits.

DISCLOSURE INFORMATION

Vehicular hydraulic systems have traditionally included engine driven pumps, but such pumps have not been integrated into the engine's accessory systems. For example, where a hydraulic pump is coupled to an engine, the pump is not used for the purpose of operating any device on the engine itself, such as a lube oil pump or fuel injection system. On the contrary, lube oil pumps have traditionally been mechanically driven, as have fuel injection pumps. In the case of the pump disclosed in U.S. Pat. No. 5,176,115, which is hereby incorporated by reference in this specification, a separate engine pump is used for the purpose of providing high pressure hydraulic fluid for a hydraulically actuated fuel injection system. The pump disclosed in the '115 patent is dedicated solely to the purpose of supplying high pressure fluid to the fuel injection system and serves no other purpose. Conversely, it is commonly known to run a hydraulic pump off the power takeoff of a vehicle, such as that shown in FIG. 1, for the purpose of supplying high pressure hydraulic fluid to the chassis of the vehicle for the purpose of operating a boom or winch or other device. Such hydraulic pumps are not, however, used for the purpose of powering anything on the engine of the vehicle. It is an advantage of the present invention that a single purpose hydraulic pump driven by the engine or prime mover of an automotive vehicle may be used as a source of high pressure hydraulic fluid for powering a variety of engine accessories and/or chassis components via internal and external fluid distribution circuits. It is another advantage of the present invention that a system according to this invention allows maximum energy efficiency by allowing control flexibility to operate various hydraulically powered machinery associated with a vehicle, such as pumps, in a manner which is essentially independent of engine speed.

SUMMARY OF THE INVENTION

An integrated hydraulic system for an automotive vehicle having a chassis and engine power includes an internal combustion engine, a hydraulic pump coupled with and driven by the engine, and at least one engine component mounted to the engine and operatively connected with and driven by fluid from the hydraulic pump. The present system further includes at least one accessory component mounted to the chassis of the vehicle with the accessory component operatively connected with and driven by fluid from the hydraulic pump. The hydraulic fluid is fed, or supplied, to various accessories and components by means of an internal hydraulic circuit contained within the engine and which is operatively connected with the pump and with a plurality of hydraulically powered engine accessories, as well as an external hydraulic circuit extending from the hydraulic pump to a plurality of hydraulically powered chassis components. The present system further includes an electronic controller for operating the hydraulic pump so as to control the effective displacement of the pump in response to the pressure and volume requirements of the accessories and components connected to the internal and external hydraulic circuits. The internal and external circuits may furnish the hydraulic fluid at a plurality of pressures, with the pressures and volume flow rates of the fluids being matched with the requirements of each particular engine accessory or chassis component.

DETAILED DESCRIPTION OF THE PREFERRED EMBODIMENTS

Figure 1:
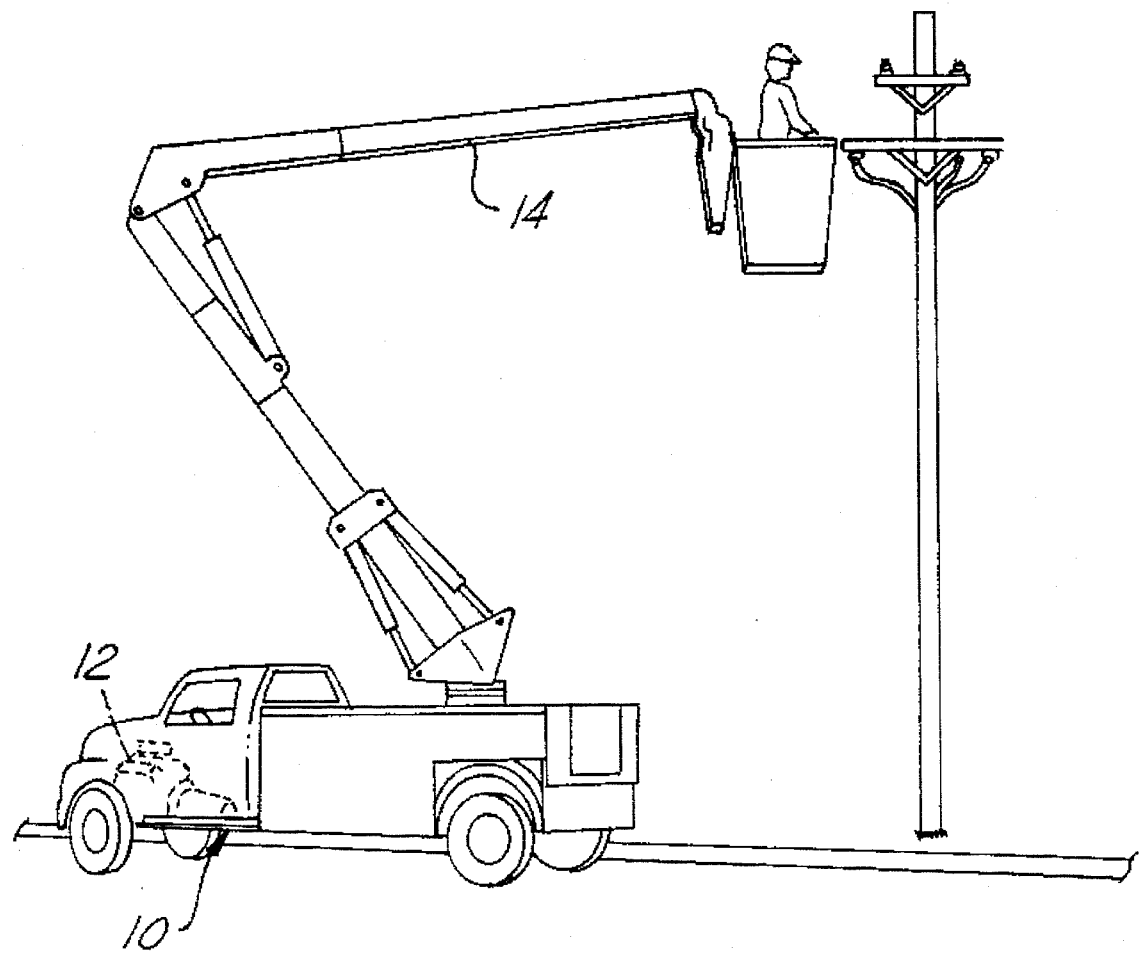
FIG. 1 depicts a vehicle having an engine and an externally powered hydraulic utility arm.
Figure 2:
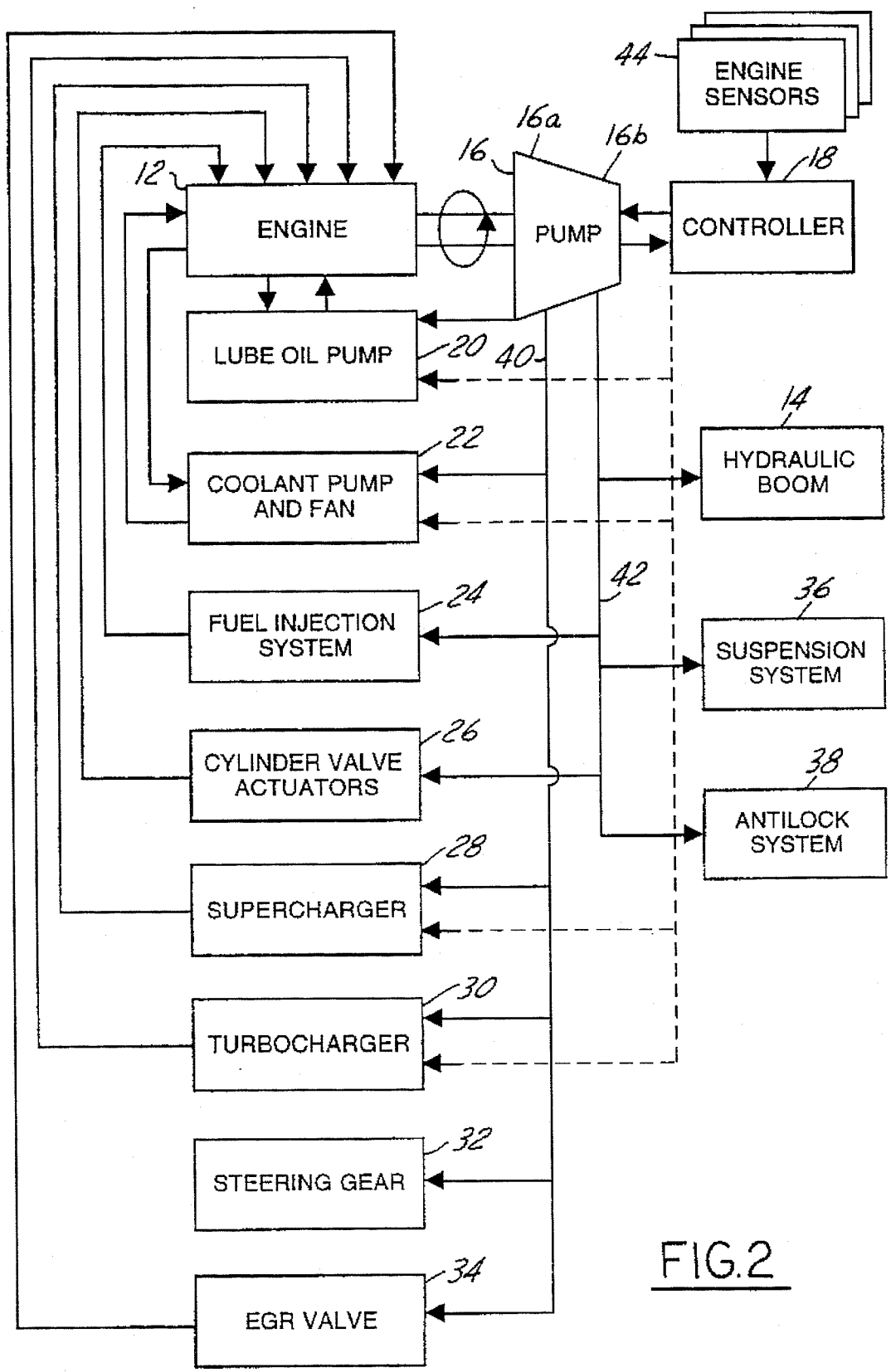
FIG. 2 is a block diagram illustrating various engine accessories and chassis components, as well as an engine and hydraulic pump and controller according to a system of the present invention.

As shown in FIG. 1, an automotive vehicle has chassis 10 which is powered by engine 12. Hydraulic boom 14 is shown as merely one of a plurality of types of hydraulically driven accessory components which may be mounted to the chassis of a vehicle and driven by fluid from a central hydraulic pump according to the present invention. A system according to the present invention further includes, a shown in FIG. 2, engine driven pump 16 having a low pressure section 16a and a high pressure section 16b. Pump 16 may be selected from any one of a variety of types known to those skilled in the art and suggested by this disclosure. Accordingly, pump 16 may comprise a piston pump having variable geometry such that the effective stroke of at least one piston located within the pump is controlled by an electronic controller, in this case controller 18. Pump 16 may also comprise a turbine pump having variable geometry, or yet other types of pumps such as a multistage pump. In any case, an integrated hydraulic power system for an automotive vehicle having a chassis and engine power will include not only engine 12 and pump 16, but also internal and external hydraulic circuits. An internal circuit, as defined herein, is contained within the general confines of the engine. The internal circuit is a hydraulic circuit which is operatively connected with the pump, as well as with a plurality of hydraulically powered engine accessories, such that each of the accessories is furnished with hydraulic fluid under pressure. In other words, engine 12 powers each of the accessories on the engine and chassis through the medium of hydraulic fluid provided by pump 16. In a system illustrated in FIG. 2, the internal and external hydraulic systems are shown as being integrated such that a number of components and systems are powered by hydraulic fluid from low pressure manifold 40 with a number of other components or systems being powered by hydraulic fluid drawn from high pressure manifold 42. In actual practice, it is expected that high and low pressure manifolds would be extended from pump sections 16a and 16b and these hydraulic service lines would extend about the chassis of the vehicle so as to comprise the external hydraulic circuit.

The function of controller 18 is to sense the output flow and pressure within the low and high pressure manifolds 40, 42 of the hydraulic system, such that the operating characteristics of pump 16, such as the effective displacements of the low and high pressure sections, may be controlled so as to assure that an adequate supply of hydraulic fluid at proper pressures is provided to the various components and accessories powered by pump 16. For example, although lube oil pump 20 will generally be operated at all times engine 12 is in operation, coolant pump and fan 22, which may comprise separate hydraulically powered units, will not be generally operated during the entire time engine 12 is in operation. As a result, the demand placed upon pump 16 by coolant pump and fan 22 will be discontinuous. Similarly, fuel injection system 24, which is supplied with high pressure hydraulic fluid from high pressure manifold 42, and cylinder valve actuators 26 which are similarly supplied with fuel from manifold 42, will be in operation during the entire time engine 12 is running. However, supercharger 28, which may comprise a pelton wheel driven type of hydraulically powered supercharger, may not be operated or have very high demand during idle or other types of operating conditions. This is true also with steering gear 32 which, although making considerable demands during low speed maneuvering of a vehicle equipped with a system according to the present invention, will need oil provided by low pressure manifold 40 at a very low demand level when the vehicle is operating at high speeds and with no steering input from the driver. Finally, EGR valve 34 will have very little power consumption and in many operating modes will have no consumption at all.

Examples of intermittent demand from hydraulically powered chassis components are hydraulic boom 14, which of course has only discontinuous usage, and suspension system 36. Those skilled in the art will appreciate in view of this disclosure that suspension system 36 could comprise not only hydraulic cylinders used for stabilizing the work platform of a utility vehicle, but also a hydraulic actuator is used to suspend a vehicle wheel, such as that shown in U.S. Pat. No. 5,232,242, which is hereby incorporated by reference in this specification. Another example of a high pressure but low volume chassis component receiving energy from high pressure manifold 42 is antilock brake system 38.

Those skilled in the art will appreciate in view of this disclosure that a hydraulically powered fuel injection system 24 could be constructed in a variety of ways. One such structure is shown in U.S. Pat. No. 5,176,115 (Campion). Similarly, cylinder valve actuators 26 could be constructed in a variety of ways. One example is given in U.S. Pat. No. 5,255,641 (Schechter). The '115 and '641 patents are hereby incorporated by reference into this specification. As to the lube oil pump 20 and coolant pump and fan 22, although the known practice is to drive these components continuously while the engine is operating and at speed ratios which are relatively invariant, these components may be operated at varying ratios to engine speed as means of increasing engine efficiency. For example, lube oil pump 20 may have an integral hydraulic motor (not shown), itself having varying displacement such that the lube oil pump drive ratio, in other words, the relationship between the number of revolutions of the engine and revolutions of the oil pump, may be changed according to engine operating conditions. For example, at idle, when lube oil flow requirements are low, pump 20 may be throttled down to the point at which pump 20 is turning at a very low ratio to engine speed, whereas at high engine speed, pump 20 may be driven at a much higher ratio so that, for example, speed of pump 20 is equal to or even greater than the speed of the engine's crankshaft. In this manner, the lube oil pump may be reduced in size and packaged in a more desirable location than has been possible with pumps driven mechanically by the engine. Similarly, coolant pump and fan 22, including a hydraulic motor driven by pump 16, may also be driven at a varying ratio to engine speed with very good results. For example, during cold engine operation, it is frequently not required to have either the radiator fan or, for that matter, the coolant pump in operation if quick warm-up is to be attained. Thus, unlike the case with mechanically driven pumps, coolant pump and fan 22 may be shut off by an controller 18.

Controller 18 could be used to operate not only hydraulic pump 16, lube oil pump 20 and coolant pump and fan 22, but supercharger 28 and hydraulically assisted turbocharger 30 as well. Accordingly, controller 18 is shown as receiving inputs from a plurality of engine sensors 44, which may include, for example, engine oil pressure, engine oil temperature, engine coolant temperature, engine coolant pressure, engine speed, engine load, ambient temperature, and other engine operating parameters known to those skilled in the art and suggested by this disclosure. For example, controller 18, sensing ambient temperature and engine coolant temperature, may decide to operate coolant pump and fan 22 at a lower or higher speed depending upon the need to circulate coolant through the engine's cooling jacket and cooling radiator (not shown). Similarly, if engine oil is at an elevated temperature, controller 18 may make the decision to increase the speed of lube oil pump 20 so as to increase the flow through an external engine oil cooler (not shown).

While the invention has been shown and described in its preferred embodiments, it will be clear to those skilled in the arts to which it pertains that many changes and modifications may be made thereto without departing from the scope of the invention.

We claim:

1. An integrated hydraulic system for an automotive vehicle having a chassis and engine power, comprising:
    an internal combustion engine;
    a hydraulic pump coupled with and driven by said engine with said pump having low and high pressure sections;
    an internal hydraulic circuit contained within said engine, with said internal circuit being operatively connected with both the low and high pressure sections of said pump, as well as with a plurality of hydraulically powered engine accessories, so as to selectively furnish hydraulic fluid under low and high pressure to said accessories;
    an external hydraulic circuit extending from both the low and high pressure sections of said hydraulic pump to a plurality of hydraulically powered chassis components, so as to selectively furnish hydraulic fluid under low and high pressure to said chassis components; and
    an electronic controller for operating said hydraulic pump so as to control the effective displacement of the pump in response to the pressure and volume requirements of the accessories and components connected to said internal and external hydraulic circuits.

2. An integrated hydraulic system according to claim 1, wherein said pump comprises a piston pump having variable geometry, such that the effective stroke of at least one piston located within the pump is controlled by said electronic controller.

3. An integrated hydraulic system according to claim 1, wherein said pump comprises a turbine pump having variable geometry.

4. An integrated hydraulic system according to claim 1, wherein said internal hydraulic circuit furnishes hydraulic fluid under pressure from the high pressure section of said hydraulic pump to a fuel injection system associated with said engine.

5. An integrated hydraulic system according to claim 1, wherein said internal hydraulic circuit furnishes hydraulic fluid under pressure to a hydraulically powered fuel injection system, as well as to a hydraulically powered cylinder valve actuation system, with both of said fuel injection and cylinder valve systems being associated with said engine, and with both said fuel injection system and said cylinder valve actuation system being furnished with hydraulic fluid from the high pressure section of the hydraulic pump.

6. An integrated hydraulic system according to claim 1, wherein said internal hydraulic circuit furnishes hydraulic fluid under a plurality of pressures to said plurality of hydraulically powered engine accessories, with the pressure of the fluid being supplied being matched with the demand of each particular accessory.

7. An integrated hydraulic system according to claim 1, wherein said external hydraulic circuit furnishes hydraulic fluid under a plurality of pressures to said plurality of hydraulically powered chassis components.

8. An integrated hydraulic system according to claim 1, wherein said electronic controller receives input signals from said hydraulic pump and from a plurality of engine operating parameter sensors.

9. An integrated hydraulic system according to claim 1, wherein said electronic controller operates an engine lubrication pump powered by hydraulic fluid from said internal hydraulic circuit.

10. An integrated hydraulic system according to claim 1, wherein said electronic controller operates an engine coolant pump powered by hydraulic fluid from said internal hydraulic circuit.

* * * * *